US006337308B1

(12) United States Patent
Adams et al.

(10) Patent No.: US 6,337,308 B1
(45) Date of Patent: Jan. 8, 2002

(54) METHOD AND APPARATUS FOR HOMOGENIZING DRILLING FLUID IN AN OPEN-LOOP PROCESS

(75) Inventors: Ben A. Adams, Berwick; Chris G. Cooper, Bayou Vista, both of LA (US)

(73) Assignee: Diamond Tank Rentals, Inc., Morgan City, LA (US)

( * ) Notice: Subject to any disclaimer, the term of this patent is extended or adjusted under 35 U.S.C. 154(b) by 0 days.

(21) Appl. No.: 09/327,903

(22) Filed: Jun. 8, 1999

(51) Int. Cl.[7] .......... C09K 7/02

(52) U.S. Cl. .......... 507/117; 507/100; 507/904; 366/302; 366/306; 366/316; 175/66

(58) Field of Search .......... 507/100, 117, 507/904; 366/316, 302, 306; 175/66

(56) References Cited

U.S. PATENT DOCUMENTS 2,075,603 A 3/1937 Dirr
2,092,992 A 9/1937 Thalman
2,210,006 A 8/1940 Rieske
2,240,841 A 5/1941 Flynn
2,505,797 A 5/1950 Sivertsen
2,578,274 A 12/1951 Weigham et al.
2,798,698 A 7/1957 Dooley
3,971,514 A 7/1976 Martinelli et al.
4,462,470 A 7/1984 Alexander et al.
4,512,523 A 4/1985 Higashimoto
4,867,256 A 9/1989 Snead
4,874,248 A 10/1989 Luetzelschwab
5,195,824 A * 3/1993 Stromberg et al. .......... 366/131
5,439,057 A * 8/1995 Weaver et al. .......... 507/100

OTHER PUBLICATIONS

"Mayco Mapp™ Mayco All Purpose Polymer," pp. 1–2, (Apr. 1999).
"Hydro Chemicals (UK) Ltd–Drilling and Completion Fluids," pp. 1–4, (May, 1999).
Catalog No. 104, by McMaster Care Supply Company, p. 331, copyright 1998.
Catalog No. 186, by Indco Inc., p. 6, copyright 1999.
"A Primer of Oilwell Drilling," by Ron Baker, Fourth Edition, copyright 1979, pp. 42–47.
Material Safety Data Sheet for Poly–Plus Rd, (1998).
Material Safety Data Sheet for DRISPAC Polymer, (1998).
Material Safety Data Sheet for XCD Polymer, (1998).
Material Safety Data Sheet for Salt, (1998).
"Functions of Drilling Fluids and Testing Procedures," in *Applied Mud Technology*, Fifth Edition, Chapter 1, pp. 3–4, by Imco Services (A Division of Halliburton Company), Dec. 1975.
"Functions of Drilling Fluids and Testing Procedures," in *Applied Mud Technology*, Fifth Edition, Chapter 4, p. 33, by Imco Services (A Division of Halliburton Company), (1975).
Material Safety Data Sheet for Soda Ash, (1998).
V3 Specifications and Performance, (No Date Available).
"Cellulose," pp. 1–5, (Apr., 1999).
"Principle Uses of Caustic Soda," pp. 1–2, (Apr., 1999).
"Rayon Fibers," pp. 1–6, by Rammohan Nanjundappa et al., (Apr. 1999).
"Caustic Soda," pp. 1–2, (Apr., 1999).
"Creater of the only EPA approved drilling lubricant!," pp. 1–3, (1998).
S.O. Lube 1000, pp. 1–3, (1998).

* cited by examiner

*Primary Examiner*—Philip Tucker
(74) *Attorney, Agent, or Firm*—Raymond G. Areaux, Esq.

(57) ABSTRACT

A drilling fluid homogenizer and method of homogenizing drilling fluid which produce a non-clogging homogenized drilling fluid at a high throughput, in an open-loop process. The non-clogging homogenized drilling fluid is capable of being created at high rate so that the non-clogging homogenized drilling fluid is available on demand to eliminate halting of drilling operations. The drilling fluid homogenizer is coupled in series with the closed-loop designed drilling fluid system and is adapted to homogenize water-based drilling fluid and other drilling fluid types, such as, synthetic drilling fluid during drilling operations on demand.

37 Claims, 6 Drawing Sheets

METHOD AND APPARATUS FOR HOMOGENIZING DRILLING FLUID IN AN OPEN-LOOP PROCESS

DESCRIPTION

1. Technical Field

The present invention relates to methods and apparatuses for processing drilling fluids used in oilfield well drilling and, more particularly, to a method and an apparatus for homogenizing drilling fluid in an open-loop process. In general, the method and apparatus for homogenizing drilling fluid dissolve polymers and other additives to homogenize drilling fluid in an effort to eliminate clogging within the closed-loop designed drilling fluid system while simultaneously increasing the throughput of the homogenized drilling fluid for use in the closed-loop designed drilling fluid system.

2. Background of the Invention

In the oilfield industry, when drilling a well, a lubricant termed "drilling fluid" or "drilling mud" (hereinafter referred to as "drilling fluid") is used. The major functions of the drilling fluid are to: (1) remove the drilled cuttings from the wellbore hole; (2) control the subsurface pressures; (3) cool and lubricate the bit and drill pipe; (4) prevent the walls of the wellbore hole from caving; (5) release the drilled cuttings and sands at the wall's surface; (6) prevent damaging effects to the formation (subterranean earth) penetrated; (7) allow maximum information from the formation penetrated; (8) suspend the cuttings and weight material when circulation of the drill is stopped; and (9) help suspend the weight of the drill string and casing, all of which are described in "FUNCTIONS OF DRILLING FLUIDS AND TESTING PROCEDURES," in *Applied Mud Technology*, Chapter 1, pages 3–4, by IMCO SERVICES (A Division of HALLIBURTON Company). Moreover, drilling fluid, as described in the Fourth Edition of "A Primer of Oilwell Drilling," by Ron Baker, copyright 1979, page 47, "provides the first line of defense against blowouts."

There are numerous formulas for the formulation of the drilling fluid some of which are water-based and others of which are oil-based or synthetic drill fluids. Depending on the subterranean geology of the earth, such as when deep sea drilling, a water-based drilling fluid is used for part of the drilling operation and thereafter, an oil-based drilling fluid is used. Moreover, depending on the subterranean geology of the earth, the water-based drilling fluid may be altered during the drilling operations. For example, when drilling a wellbore hole, a 2400 ft. subterranean section may require a drilling fluid with a 10% salt content while, just below, another subterranean section of 2000 ft. may require a drilling fluid with a much higher salt content.

A water-based drilling fluid may include, without limitation: (1) water (such as, salt water or fresh water), the drilling fluid base, (2) a viscosifier polymer, such as, XCD Polymer (a biopolymer), available from a Business Unit of M-I L.L.C., for assisting in suspending cuttings; (3) a fluid loss polymer, such as, DRISPAC Polymer (a cellulosic polymer) , available from a Business Unit of M-I L.L.C., for forming a filter cake around the wellbore hole wall surface; (4) a stabilization polymer, such as, Poly-Plus RD (an acrylic polymer), available from a Business Unit of M-I L.L.C.; and, (5) other additives. Examples of other additives in the drilling fluid are (1) for the control of the salt content, sodium chloride, available from by a Business Unit of M-I L.L.C.; and, (2) for water treatment, soda ash (sodium carbonate), available from a Business Unit of M-I L.L.C. to treat out calcium which may be present in water. Nevertheless, there are numerous alternatives which can be substituted for the above identified polymers and additives, as well as, other polymers and/or additives which may be need to create the drilling fluid for the specific subterranean geology of the earth. For example, the MAYCO MAPP™polymer, as described in "MAYCO MAPP™ MAYCO All Purpose Polymer," from the web site (www.maycowellchem.com), can be used in the same manner as DRISPAC. Other formate brines are described in "HYDRO CHEMICALS (UK) LTD-DRILLING AND COMPLETION FLUIDS," from the web site (www.offshore-techonogy.com).

U.S. Pat. No. 4,867,256, issued to Snead, entitled "INJECTION OF POLYMER CHEMICALS INTO DRILLING MUD" discloses various functions and characteristics of drilling muds and is incorporated herein by reference as if set forth in full below. However, the invention of the Snead patent is primarily focused on introducing a liquid water loss controlling polymer into the suction of a main circulating mud pump rather than by pouring the liquid chemical into the open collar of a drill pipe joint.

U.S. Pat. No. 4,462,470, issued to Alexander, entitled "EXTRUSION OF BENTONITE CLAY FOR FLUID LOSS REDUCTION IN DRILLING FLUIDS," discloses general principles of drilling fluid. However, the Alexander invention is related to extruding bentonite clay into clay pellets having a majority of oriented clay platelets. The output of the mill used for extruding the bentonite clay includes a rotating wiper blade, scraping blade or cutter positioned on the interior side of apertured surface of a die plate to extrude bentonite clay into clay pellets having a majority of oriented clay platelets. The mill is used to create bentonite pellets which are dried and ground. Alexander does not teach using the mill in the processing of drilling fluids.

Referring now to FIG. 1, a general diagram of a conventional closed-loop designed drilling fluid system 1 is shown and described, in brief, in the Fourth Edition of "A Primer of Oilwell Drilling," by Ron Baker, copyright 1979, pages 42–46. It should be noted that the closed-loop designed drilling fluid system 1 is designed to be closed-loop in that the drilling fluid flowing therein is adapted to be recovered and recycled through the closed-loop designed drilling fluid system 1. However, during drilling operations, drilling fluid is inherently lost from the closed-loop designed drilling fluid system 1 and, thus, may need to be replenished.

The closed-loop designed drilling fluid system 1 includes at least one holding tank T1, an active tank T2, and at least one reclamation tank T3 which stores the initial mixture of the drilling fluid, the processed drilling fluid, and the recycled drilling fluid, respectively. As can be appreciated, the closed-loop designed drilling fluid system 1 begins with hopper H1 having the poured contents flowing to the holding tank T1 and ends with the at least one reclamation tank T3. The closed-loop designed drilling fluid system 1 includes further includes suction line SL, pumping station PS, discharge line DL, stand pipe SP, rotary hose RH, wellbore hole WH, drilling fluid return line RL, and shale shaker SS. Finally, the kelly K, coupled to the rotary hose RH, the drill pipe DP and drill bit DB (collectively, the "drilling unit") are coupled in series with the closed-loop designed drilling fluid system 1 to complete the closed-loop.

During drilling operations, the drilling fluid is pumped from the active tank T2 via suction line SL, through the pumping station PS via filter/screen FS to the discharge line DL, up through the stand pipe SP, through the rotary hose RH, down the kelly K and drill pipe DP and out though drill bit DB. As the drilling fluid exits through the drill bit DB, the drilling fluid moves upward in the wellbore hole WH to the drilling fluid return line RL and continues to flow over shale shaker SS. The shale shaker SS includes a mesh M positioned over the at least one reclamation tank T3 which allows the drilling fluid to be poured into the at least one reclamation tank T3. Thereby, the drilling fluid is recycled for re-circulation through the closed-loop designed drilling fluid system 1. The above description of the closed-loop designed drilling fluid system 1 is of course rather simplistic. While not shown, further included in the closed-loop designed drilling fluid system 1 are desilters, desander and/or degasser for filtering fine silt, sand and gas from the drill fluid before re-circulation.

In a holding (mixing) tank T1 of the drilling rig, having a storage capacity of, for example, 10 barrels to 500 barrels, a mixture of water (such as, saltwater or freshwater), polymer(s) and other additives are added together via hopper H1. The polymer(s) and other additives are generally in powder form (hereinafter referred to as "granules"). As the mixture (drilling fluid) is formed, the polymers and additives begin to dissolve in the water and/or mixture of water and additives. As the polymers dissolve, a viscous slim-like drilling fluid is created. However, as the polymers dissolve and the slim-like drilling fluid created, globs of undissolved polymer granules, especially, the fluid loss polymer granules, are formed much like the result of flour added to water.

In general, non-homogenized drilling fluid, upon inspection, includes suspended slim-like strings, globs of undissolved polymer granules which are, typically, of the fluid loss polymer such as, DRISPAC Polymer, and other particulate matter. While the undissolved granules of the globs are, generally, the powder of the fluid loss polymer such as, DRISPAC Polymer, other powders of the additives and/or other polymers may likewise become entrapped in such globs as the globs are formed. The undissolved polymer granules of the globs are entrapped since the globs have resiliently deforming and rapidly resealing capabilities which, in general, result when the undissolved polymer granules contact the water.

The fluid loss parameter of the drilling fluid is designed to provide a thin but tough filter cake or barrier circumferentially around the wellbore along the walls of the formation to retard invasion of the drilling fluid. It is desirable to use additives and polymers which serve to improve the toughness and firmness of the filter cake or barrier created by the drilling fluid. It should be noted, the toughness and firmness are relative to an environment in which drilling via a rotating drill bit is being performed. Thus, as can be appreciated, any additive or polymer which is not dissolved in the mixture of the drilling fluid compromises the effectiveness of the drilling fluid to perform the major functions, set forth above. Filtration or fluid loss and adverse effects of an excessive filtration rate are described in "FILTRATION," of *Applied Mud Technology*, Chapter 4, pg. 9, by IMCO SERVICES (A Division of HALLIBURTON Company), which is incorporated herein by reference. As described, an adverse effect of an excessive filtration rate includes caving of the wellbore hole, which is highly undesirable, as a result of high water-loss muds.

More importantly, that which serves to create such fluid loss parameter (fluid loss polymer, such as, DRISPAC polymer) so that the filter cake is tough and firm, when dissolving creates resiliently deforming and rapidly resealing globs of sealed undissolved polymer granules in the slim-like drilling fluid.

As can be appreciated, there is a continuing need in the drilling industry for the slim-like drilling fluid, having these globs, to be processed to reduce these globs in order to dissolve the undissolved polymer granules to achieve the viscosity and fluid loss parameters of the drilling fluid and decrease the size of the globs so that the drilling fluid does not clog the closed-loop designed drilling fluid system's filter/screen FS at the pumping station PS. In general, the closed-loop designed drilling fluid system's filter/screen FS may include pores of approximately ¼ of an inch.

Typically, a closed-loop system (hereinafter a "Closed-Loop Preprocessor") is used to dissolve and mix the drilling fluid to ready it for use in the closed-loop designed drilling fluid system 1. The prior art Closed-Loop Preprocessors have proven to be unsatisfactory. One known time-consuming system can reduce the glob size to an acceptable level after cycling the drilling fluid in such a Closed-Loop Preprocessor three (3) times. However, such acceptable level is in no way non-clogging compared to my invention.

The known Closed-Loop Preprocessors utilize a special pump (such as, a "Poly Gator") and a recycling tank. The mixture from the rig's holding tank is pumped into a centrifugal pump operated by, for example, a 100-horsepower motor. The centrifugal pump includes a propeller which mixes and beats the drilling fluid in an effort to homogenize the drilling fluid and to dissolve, and thus partially reduce, the globs of the undissolved polymer(s) granules therein. The outlet of the centrifugal pump has an orifice which is partially blocked to minimize the flow of the drilling fluid therethrough to increase the processing time within the pump. A large apertured screen is also used within the pump chamber to filter the drilling fluid.

The drilling fluid pumped out of the outlet is sent to the recycling tank wherein the drilling fluid is checked visually (since the fluid is essentially clear) to estimate the size of the globs remaining. As the globs are reduced, the polymer granules are dissolved until an acceptable glob size within the drilling fluid is achieved. Typically, the drilling fluid must be recycled through the Closed-Loop Preprocessors at least two (2) more times to achieve an acceptable glob size. Essentially, all the drilling fluid in the Closed-Loop Preprocessor is recycled. Thus, the Closed-Loop Preprocessor cannot provide a continuous "on demand" supply of drilling fluid. Instead, the Closed-Loop Preprocessor delays the flow of the drilling fluid to the closed-loop designed drilling fluid system until an acceptable glob size is achieved. In general, the total effective throughput of a Closed-Loop Preprocessor is significantly less than that of my invention since recycling is required for the Closed-Loop Preprocessor and recycling is not required for my invention.

It should be further noted, that when using a drilling fluid preprocessed by said Closed-Loop Preprocessor, drilling operations are halted numerous times so that the clogged filter/screen FS of the closed-loop designed drilling fluid system 1 can be cleaned and unclogged. Every time, drilling operations are halted, on the average, an hour is lost at a cost of approximately $8000–$10,000 per hour. It is estimated that approximately $50,000 are lost due to clogging of the filter/screen FS for a 4 or 5-day drilling operation and increased for longer drilling operations.

One of the biggest challenges in dissolving the undissolved polymer granules in the globs is that the globs stretch and deform when beaten, such as, by a propeller. As the globs of undissolved polymer granules are hit or wacked, the resiliently deformable and rapidly resealable globs, entrapping and sealing the undissolved polymer granules, are not necessarily penetrated but instead deformed and/or stretched. Thus, the polymer granules remain entrapped in such resiliently deformable and rapidly resealable glob.

Since the known Closed-Loop Preprocessors are time consuming and have an inadequate throughput, typically, for offshore drilling, such as deep sea drilling, a start-up load of drilling fluid is pre-processed onshore and delivered to the offshore drilling rig site via a large (250 ft. plus) boat. Thereby, any delays in the initial drilling operations due to the processing of a sufficient load of the drilling fluid to acceptable levels are essentially eliminated. Not only are there costs associated with the transport of the initial start-up load of the processed drilling fluid, sea water or fresh water(the base) used to mix the drilling fluid may need to be hauled onshore for the processing of the drilling fluid. Depending on the salt content of the sea water and, especially, fresh water, hauled onshore and the necessary salt content of the drilling fluid, 2000 lbs. or more of salt for approximately twenty (20) barrels may need to be added for the initial start-up load of the drilling fluid.

The costs associated with the preprocessing of the drilling fluid, the transport of the pre-processed drilling fluid to the offshore drilling site and the costs associated with hauling the sea water or fresh water onshore for the initial load of the drill fluid still does not compare with the hourly costs associated with an operational drilling rig site. Nevertheless, while great effort is taken for the creation of the initial start-up load of the drill fluid, such drilling fluid, oftentimes, clogs the closed-loop designed drilling fluid system's filter/screen FS. Thereby the drilling operations must be shutdown so that the closed-loop designed drilling fluid system's filter/screen FS can be cleaned and unclogged.

Even though an initial start-up load is created onshore and transported to the drilling rig site so that drilling operations are essentially not delayed and thus the cost of an operational rig site reduced, at times there is still an inadequate supply of drilling fluid during the drilling operations. Depending on the rig, the drilling operation and the depth of the wellbore hole, 100 gallons/hr. to a few 1000 gallons/hr. of the drilling fluid may be required. If there is an insufficient supply of the drilling fluid, the drilling rig must be stopped until the supply of the drilling fluid is available. At an average cost of approximately $210,000 a day for an operational offshore drilling rig site, any downtime of the drilling operations is very costly and, thus, highly undesirable.

Nevertheless, the required drilling fluid for drilling operations is essentially variable since there are numerous unknown factors, such as, without limitation, bad weather delaying the arrival of additional pre-mixed drilling fluid from onshore and/or excessive drilling fluid circulation losses.

In an effort to minimize the downtime of the drilling operations in such instances, on occasion, if the supply of the drilling fluid is unavailable or insufficient, the drilling fluid having an unacceptable dissolved percentage is used which tends to clog the filter/screen FS. Thereby, the drilling operations must be shutdown and the filter/screen FS cleaned.

Another drawback with the present processed drilling fluid is that the drilling fluid clogs the shale shaker SS of the closed-loop designed drilling fluid system 1 thereby preventing the drilling fluid from entering the at least one reclamation tank T3. The drilling fluid sheens over the pores of the mesh M of shale shaker SS. Thereby, the drilling fluid is obstructed from filtering through the pores of the mesh M. More specifically, "fish eyes" (clear globs) are readily visible over the mesh of the shale shaker SS. As is apparent, the drilling fluid sheen and "fish eyes" over the mesh of the shale shaker SS prevents the drilling fluid from being filtered through the mesh and, thereafter, recycled. Instead, the drilling fluid spills over to the slide S, used for the removal of the drill cuttings, and is forever lost—overboard, if on an offshore rig.

Moreover, every time the closed-loop designed drilling fluid system's filter/screen FS is cleaned to unclog such filter/screen FS, valuable polymers are forever lost. For example, the DRISPAC Polymer costs approximately $130.00 for a 50 lb. sack and the XCD Polymer costs approximately $125.00 for a 25 lb. sack. When drilling, a 2000 ft. wellbore hole section, it is common to use 500 barrels (42 gallons per barrel) of a water-based drilling fluid requiring 750 lbs. (1.5 pounds/barrel) of the DRISPAC Polymer and 250 lbs. (0.5 pounds/barrel) of the XCD Polymer.

Several devices have been patented which are aimed at mixers, blenders and grinders.

U.S. Pat. No. 2,240,841, issued to Flynn, entitled "COMBINED MIXING AND GRINDING MILL," illustrates three stationary cutting disks having perforations and elongated slots whereby such cutting disks function to divide the mill into stages. Each stage includes a plurality of pitched circumferentially spaced blades or paddles described as thoroughly mixing the material. Each stage further includes blades or paddles to mix and feed the material and force the material through apertures in the fixed cutting disk. Moreover, the desired functions of the paddles include rotating and consequently forcing the material with great pressure through the apertures of the disks and crushing the material against the disk. On the rear side of each of the stationary cutting disks, there is a means for cutting and feeding ("rotary cutter"). The arms of the rotary cutter cut the material in slots wherein such material also becomes crushed. However, the location of the rotary cutter having arms on the exit side of the stationary cutting disks would not eliminate the buildup of drilling fluid through the apertures.

U.S. Pat. No. 2,578,274, issued to Weigham et al., entitled "MANUFACTURE OF VISCOSE," discloses, in general, forcing through a plurality of perforations formed in bases cellulose xanthate and aqueous caustic soda, which is known for the manufacturing of rayon. The Weigham et al. patent describes that for maximum disintegration, there should be the smallest practical clearance between the rotating blades and the perforating bases so that the blades exert a cutting action when forcing the xanthate-caustic soda mixture through the perforation in the bases. The blades are described as 10 to 15 thousandths of an inch above its associated grid. The blades of the Weigham et al. invention are described as having a top edge leading the bottom edge which is different from the present invention. The perforations in bases are described as $\frac{3}{8}$ of an inch, $\frac{5}{16}$ of an inch and $\frac{3}{16}$ of an inch, respectively. Moreover, the cylindrical internal diameter is 20 inches. The Weigham et al. patent passes the mixture at a rate of 38,000 lbs./hr. The Weigham et al. patent passes the mixture through the chamber with no pressure in the chambers, unlike the present invention, and the chambers are not filled to capacity, unlike the present invention. The mixture from the chamber of the Weigham et al. patent is passed to a secondary paddle tank mixture where it is slowly stirred to complete solution unlike the present invention. Thus, unlike the present invention, the Weigham et al. invention is not concerned with reducing the lumps to a non-clogging size for use in a closed-loop designed drilling fluid system or for use "on demand" in a closed-loop designed drilling fluid system. Moreover, the Weigham et al. invention is not concerned with homogenizing drilling fluid, such as, a water-based drilling fluid, but instead is concerned with the manufacture of viscose.

U.S. Pat. No. 2,798,698, issued to Dooley, entitled "COMBINED INJECTION AND BLENDING APPARATUS," discloses three stators which include a series of perforations arranged in concentric rows which permit the passage of the liquid and the breakup of the initially mixed streams into relatively fine streams. Between the stators there are two rotors, respectively. Rotors include a plurality of spokes which have a substantially rectangular cross section. The spokes, provide sets of vanes which act as shearing elements to vigorously breakup and mix the individual streams delivered through the perforations of the stators.

U.S. Pat. No. 2,092,992, issued to Thalman, entitled "EMULSIFYING APPARATUS" discloses an emulsifying apparatus having a series of helical blades for effecting gyration of the material toward dispersing and grinding disks. In general, globules of immiscible fluids are readily broken up and united to form a homogeneous emulsion. A freely rotating disk and stationary disk, having apertures and apertures, respectively, formed therein function to grind the material therebetween.

U.S. Pat. No. 2,075,603, issued to Dirr, entitled "MEAT GRINDER AND CUTTING KNIFE THEREFOR," U.S. Pat. No. 2,210,006, issued to Rieske, entitled "FOOD GRINDING MACHINE," U.S. Pat. No. 2,505,797, Sivertsen, entitled "MEAT CHOPPER," U.S. Pat. No. 3,971,514, issued to Martinelli et al., entitled "MEAT GRINDER ATTACHMENT" and U.S. Pat. No. 4,512,523, issued to Higashimoto, entitled "APPARATUS FOR MINCING FROZEN MEAT INTO GROUND MEAT" disclose, in general, meat grinders having helically-shaped or screw-shaped members in at least one chamber for transporting the meat to a rotary cutter or knife in relative close proximity to an apertured baffle wall. In general, the grinding is achieved by the passage of the meat through the apertures in the baffle wall.

U.S. Pat. No. 4,874,248, issued to Luetzelschwab, entitled "APPARATUS AND METHOD FOR MIXING A GEL AND LIQUID" discloses a low viscosity liquid, such as a monomer, which is mixed with a gel. The gel and monomer flow through a cylinder containing spaced rotating discs and stationary discs mounted between the rotating discs. The apertures in the discs pass therethrough the liquid and gel, breaking down the gel into small particles.

As can be appreciated, there exists a continuing need for a homogenizer which mixes and homogenizes drilling fluid so that upon inspection the slim-like strings are significantly reduced, if not eliminated, and globs of undissolved polymer granules which are, typically, of the fluid loss polymer, are reduced to a non-clogging glob size sufficiently smaller than the pores of the closed-loop designed drilling fluid system's filter/screen FS. Since the slim-like strings are essentially eliminated, the other particulate matter within the homogenized drilling fluid is more evenly distributed therein.

There exists a continuing need for a homogenizer which is capable of homogenizing the drilling fluid and dissolving the polymers of the drilling fluid with little or no waste of undissolved polymers; eliminating the problematic "fish eyes" usually visible at the shakers; providing a homogenized drilling fluid which includes particles or globs having a size sufficiently less than the pores of the filter/screen FS so that the drilling fluid is otherwise non-clogging when flowing though the closed-loop designed drilling fluid system; and, providing on demand availability of non-clogging homogenized drilling fluid for use in drilling operations.

There is a continuing need for a homogenizer which creates non-clogging homogenized drilling fluid in an effort to maximize the reclamation of the drilling fluid; eliminate halting of the drilling operations due to a clogged filter/screen FS; eliminate and/or reduce the need for and cost of transporting an initial preprocessed load of drilling fluid to the offshore drilling rig; and, enhance the drilling fluid formula and thus its properties by maximizing the percentage of the dissolved polymers suspended in the non-clogging homogenized drilling fluid.

As will be seen more fully below, the present invention is substantially different in structure, methodology and approach from that of the prior mixers, blenders and grinders.

SUMMARY OF THE INVENTION

The preferred embodiment of the homogenizer of the present invention solves the aforementioned problems in a straight forward and simple manner.

Broadly, what is provided is an open-loop drilling fluid homogenizer for use in a closed-loop designed drilling fluid system comprising: a fluid inlet adapted to receive a water-based drilling fluid; an expanded tubular pipe portion coupled to said fluid inlet; homogenizing means housed in said expanded tubular pipe portion, for homogenizing, under pressure, in an open-loop process said water-based drilling fluid having suspended therein globs of undissolved polymer granules for creating a non-clogging homogenized water-based drilling fluid having substantially all glob sizes of said globs of undissolved polymer granules less than or equal to a predetermined non-clogging glob size; and, a fluid outlet coupled to said expanded tubular pipe portion adapted to output said non-clogging homogenized water-based drilling fluid.

In an alternate embodiment, what is provided is a drilling fluid homogenizer for homogenizing drilling fluid comprising: a chamber having a fluid inlet and a fluid outlet; and, a plurality of homogenizing classifying stages in series fluid communication in said chamber. Each homogenizing classifying stage comprises: homogenizing means for homogenizing said drilling fluid; a classifying filtering means for classifying the filtering of the homogenized drilling fluid to create classified filtered homogenized drilling fluid, and a shearing means having a minimum clearance with said filtering means for shearing said drilling fluid. The classifying filtered homogenized drilling fluid of said filtering means of a last homogenizing classifying stage is a non-clogging homogenized drilling fluid.

In view of the above, an object of the present invention is to provide a homogenizer which is capable of homogenizing the drilling fluid and dissolving the polymers of the drilling fluid with little or no waste of undissolved polymers; eliminating the problematic "fish eyes" usually visible at the shakers; providing a homogenized drilling fluid which includes particles or globs having a size sufficiently less than the pores of the closed-loop designed drilling fluid system's filter/screen so that the drilling fluid is otherwise non-clogging when flowing though the closed-loop designed drilling fluid system; and, providing on demand availability of non-clogging homogenized drilling fluid for use in drilling operations.

Another object of the present invention is to provide a homogenizer which mixes and homogenizes drilling fluid so that upon inspection the slim-like strings are significantly reduced, if not eliminated, and globs of undissolved polymer granules which are, typically, of the fluid loss polymer, are reduced to a non-clogging glob size sufficiently smaller than the pores of the filter/screen. Since the slim-like strings are essentially eliminated, the other particulate matter within the homogenized drilling fluid is more evenly distributed therein.

A further object of the present invention is to provide a homogenizer which creates non-clogging homogenized drilling fluid in an effort to maximize the reclamation of the non-clogging homogenized drilling fluid; eliminate halting of drilling operations due to a clogged filter/screen of the closed-loop designed drilling fluid system; eliminate and/or reduce the need for and cost of transporting an initial pre-processed load of drilling fluid to the offshore drilling rig; and, enhance the drilling fluid formula and thus its properties by maximizing the percentage of the dissolved polymers suspended in the non-clogging homogenized drilling fluid.

A further object of the invention is to provide a homogenizer with a filtering baffle wall and a shearing propeller or shearing means having a minimum clearance with the filtering baffle wall to counter-react to the resiliently deforming and resiliently resealing capabilities of the globs of undissolved polymer granules, which are resisting filtering and, thus, to nullify the tendency of the drilling fluid to buildup, obstruct or clog the filtering baffle wall.

It is a still further object of the invention to provide a homogenizer with a relatively thin filtering baffle wall to eliminate clogging of the drilling fluid within the bored filtering channels of the filtering baffle wall.

It is a still further object of the present invention to provide a homogenizer with a shearing propeller or shearing means having a plurality of pitched radial blades wherein the pitch of the radial blade serves to direct the drilling fluid in a direction counter to the flow of the drilling fluid and thus away from the filtering baffle wall.

It is a still further object of the present invention to provide a homogenizer with a plurality of homogenizing stages in series which are in fluid communication and each of which are separated by such a filtering baffle wall to create a plurality of homogenizing classifying stages.

It is a still further object of the present invention to provide a homogenizer with a plurality of homogenizing stages wherein each stage maximizes the counter-reaction to resiliently deforming and rapidly resealing capabilities of the globs of undissolved polymer granules to penetrate the globs and thus unseal and dissolve at least part of the undissolved polymer granules.

It is a still further object of the present invention to provide a homogenizer with a plurality of homogenizing stages wherein each stage maximizes the counter-reaction to the deforming capability of slim-like strings within the drilling fluid.

It is a still further object of the present invention to provide each homogenizing classifying stage with a cutting means and a shearing means wherein the shearing means has a minimum clearance with the filtering baffle wall.

It is a still further object of the present invention to provide each homogenizing stage with a means for creating turbulence to minimize, if not prevent, binding or coalescing of the globs of undissolved polymer granules within each homogenizing classifying stage.

It is a still further object of the present invention to provide a homogenizer which is essentially an expanded tubular pipe portion having a plurality of homogenizing classifying stages for homogenizing the drilling fluid in an open loop process and which is placed in series with the holding tank and the active tank of the closed-loop designed drilling fluid system.

It is a still further object of the present invention to provide a homogenizer which homogenizes drilling fluid rapidly to a non-clogging state without recycling of the drilling fluid through the homogenizer.

It is a still further object of the present invention to provide a homogenizer which is adapted to homogenize all drilling fluid formulas including water-based drilling fluids and synthetic or oil-based drilling fluids.

A still further object of the present invention is to provide a method which provides an open-loop process for providing a sufficiently high throughput for on demand availability of non-clogging homogenized drilling fluid to a drilling unit.

Broadly, what is further provided is a method of homogenizing drilling fluid, having globs of undissolved polymer granules having clogging glob sizes and other additives, in an open-loop process for providing non-clogging homogenized drilling fluid to use in a closed-loop designed drilling fluid system, said method including the steps of: (1) homogenizing said drilling fluid to create homogenized drilling fluid and to reduce said clogging glob sizes; (2) filtering a flow of said homogenized drilling fluid to create said non-clogging homogenized drilling fluid having globs of a non-clogging glob size when flowing in said closed-loop designed drilling fluid system; and, (3) during the step of (2), shearing said globs of said undissolved polymer granules having said clogging glob sizes suspended in said flow of said homogenized drilling into said globs of said non-clogging glob size.

Broadly, what is still further provided is a method of drilling a wellbore hole using a closed-loop designed drilling fluid system wherein said closed-loop designed drilling fluid system includes at least one holding fluid tank, at least one active fluid tank, a drilling fluid pumping station, and at least one reclamation fluid tank; and a drilling unit coupled in series with said closed-loop designed drilling fluid system, said method including the steps of: (1) creating a drilling fluid source in a holding fluid tank having clogging properties wherein said drilling fluid source includes clogging glob sizes of globs of undissolved polymer granules and other additives; and, (2) providing a supply of said drilling fluid source from said holding fluid tank at a flow rate to a drilling fluid homogenizer. In said drilling fluid homogenizer, the steps of (3) homogenizing the drilling fluid source to create homogenized drilling fluid and to reduce said clogging glob sizes; (4) filtering a flow of said homogenized drilling fluid to create said non-clogging homogenized drilling fluid having globs of a non-clogging glob size when flowing through said pumping station; and, (5) during the step of (4), shearing said globs of said undissolved polymer granules having said clogging glob sizes suspended in said flow of said homogenized drilling fluid into said globs of said non-clogging glob size; (6) filling an active fluid tank with said non-clogged homogenized drilling fluid. In said closed-loop designed drilling fluid system, performing the steps of (7) providing the non-clogged homogenized drilling fluid to said drilling unit; and, (8) drilling said wellbore hole with said drilling unit using said non-clogged homogenized drilling fluid.

Broadly, what is still further provided is a method of maximizing counter-reaction to resiliently deforming and rapidly resealing capabilities of globs of undissolved polymer granules in a drilling fluid to dissolve said undissolved polymer granules, the method including the steps of: (1) cutting said drilling fluid to counter-react to said resiliently deforming and rapidly resealing capabilities of said globs of said undissolved polymer granules suspended in said drilling fluid; (2) during the cutting of step (1) , penetrating at least one glob of said globs to dissolve at least some of said undissolved polymer granules of said at least one glob; (3) filtering a flow of said drilling fluid to create filtered drilling fluid having a predetermined glob size limit; and, (4) shearing said globs of said undissolved polymer granules suspended in said flow of said drilling fluid into globs of the predetermined glob size limit.

In view of the above, an object of the present invention is to provide a method of homogenizing drilling fluid and a method of drilling a wellbore hole which are capable of supplying a source of drilling fluid without any need for recycling and minimizing all globs to a predetermined minimum size significantly smaller than the closed-loop designed drilling fluid system's filter/screen to eliminate any buildup or clogging. Thereby, the loss of revenue for stopped drilling operations for a clogged filter/screen from undissolved drilling fluid or unavailable supply of drilling fluid is significantly minimized, if not, eliminated.

In view of the above objects, it is a feature of the present invention to provide a drilling fluid homogenizer which is simple to manufacture.

Another feature of the present invention is to provide a drilling fluid homogenizer which is relatively simple structurally.

A further feature of the present invention is the production of non-clogging drilling fluid at a continuous rate of 5000–6000 gallons/hr.

A still further feature of the present invention is the production of non-clogging drilling fluid at a continuous rate of 17,000 to 21,000 gallons/hr.

A still further feature of the present invention is that the non-clogging glob sizes are sufficiently smaller than apertures of a closed-loop designed drilling fluid system's filter/screen in the pumping station which pumps drilling fluid to the drilling unit.

A still further feature of the present invention is to provide a high throughput of non-clogging homogenized drilling fluid which has an increased percentage of dissolved polymers for a given drilling fluid formula.

An advantage of the present invention is that the non-clogging homogenized drilling fluid minimizes halting of drilling operations and, thus, reduces the costs associated with drilling a wellbore hole.

A further advantage of the present invention is that the non-clogging homogenized drilling fluid maximizes the ability of the closed-loop designed drilling fluid system to recover the non-clogging homogenized drilling fluid flowing from the wellbore hole.

A still further advantage of the present invention is that the increased percentage of dissolved polymers in the drilling fluid formula simplifies overall drilling fluid engineering.

A still further advantage of the present invention is that the increased percentage of dissolved polymers in the drilling fluid formula increases the integrity of the drilling fluid formula to perform its major functions during drilling operation.

The above and other objects, features and advantages of the present invention will become apparent from the drawings, the description given herein, and the appended claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

DESCRIPTION OF THE EXEMPLARY EMBODIMENT

Figure 2A:
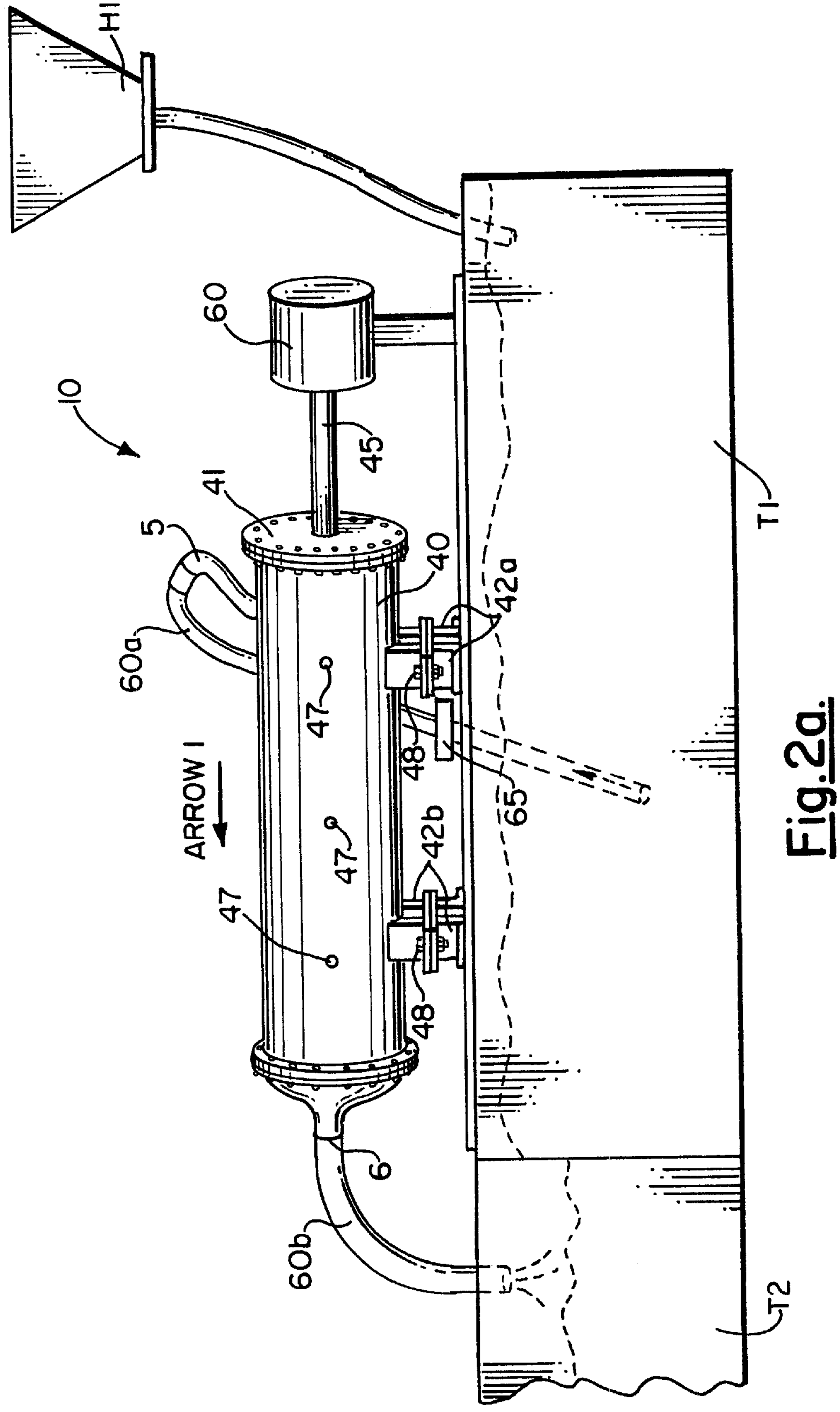
FIG. 2*a* illustrates a side view of the drilling fluid homogenizer of the present invention.
Figure 2B:
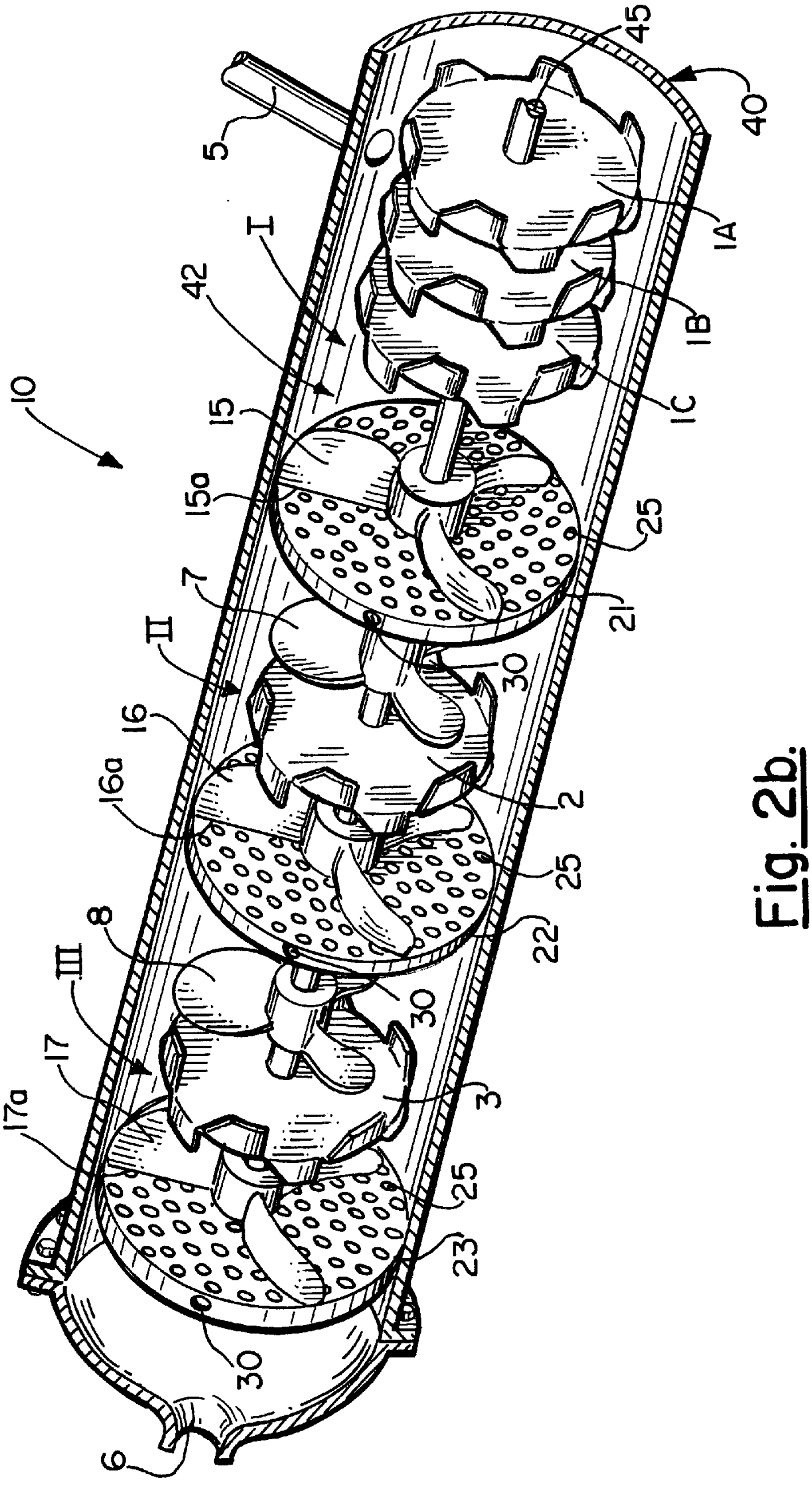
FIG. 2*b* illustrates a perspective view of the drilling fluid homogenizer of the embodiment of FIG. 2*a* having a portion of the homogenizing housing chamber removed.

Referring now to the drawings, and in particular FIGS. 2*a* and 2*b*, the drilling fluid homogenizer of the present invention is designated generally by the numeral 10. In general, the homogenizer 10, of the present invention, comprises a homogenizing housing chamber or tubular pipe 40 and a homogenizing means 42 housed in the tubular pipe 40, for homogenizing, under pressure, in an open-loop process the drilling fluid for creating a non-clogging homogenized drilling fluid having substantially all glob sizes of globs of undissolved polymer granules less than or equal to a predetermined non-clogging glob size.

In the preferred embodiment, homogenizing means 42 includes a rotatable shaft 45 rotatably mounted along the axis of the tubular pipe 40 wherein the tubular pipe 40 is divided into a plurality of homogenizing classifying stages I, II, and III, in series, and which are in fluid communication. The plurality of homogenizing classifying stages I, II, and III homogenize the drilling fluid until the drilling fluid becomes essentially non-clogging homogenized drilling fluid when flowing through the closed-loop designed drilling fluid system 1 of FIG. 1.

While the preferred embodiment of the homogenizing means 42 includes classifying stages, the homogenizing means 42 may be only one stage having a plurality of spaced cutting means 1*a*, 1*b*, 1*c*, 2, 3, spaced along the shaft 45, and a classifying filtering baffle wall 23 at the output of the homogenizing means 42 to output the non-clogging homogenized drilling fluid. The arrangement of the plurality of spaced cutting means 1*a*, 1*b*, 1*c*, 2, and 3 should maximize the counter-reaction to the resiliently deforming and rapidly resealing capabilities of the globs.

Figure 1:
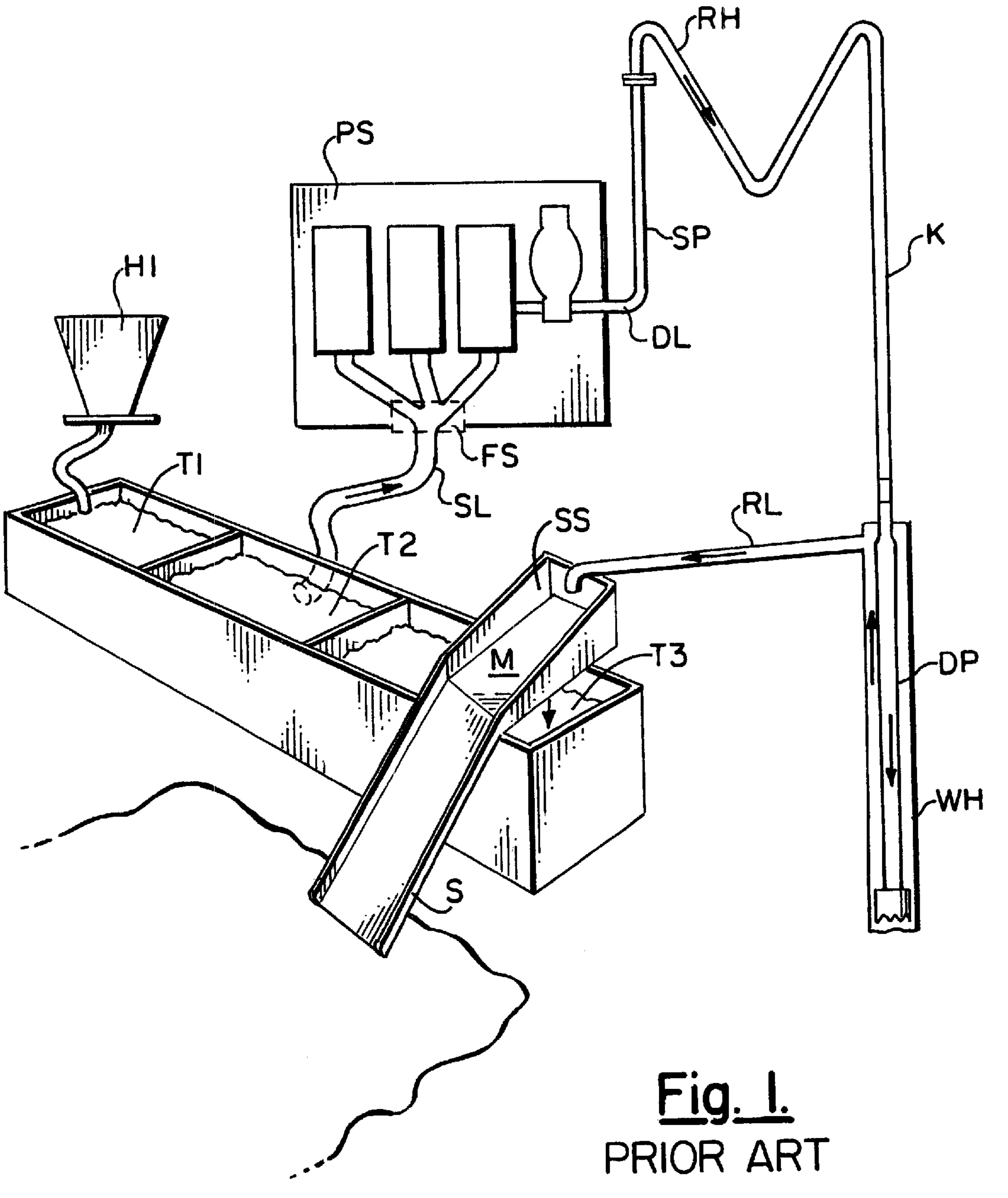
Fig. 1. PRIOR ART
FIG. 1 illustrates a general closed-loop designed drilling fluid system of a drilling rig system.

As best seen in FIGS. 2*a* and 2*b*, the homogenizer 10 is essentially an expanded tubular pipe portion having the plurality of homogenizing classifying stages I, II, and III for homogenizing the drilling fluid in an open loop process and which is placed in series with the holding tank T1 via fluid inlet 5 and the active tank T2 via fluid outlet 6 of the closed-loop designed drilling fluid system 1 (FIG. 1). Such expanded tubular pipe portion has coupled thereto the fluid inlet 5 and the fluid outlet 6 wherein the orifice of the fluid inlet 5 and orifice the fluid outlet 6 are significantly smaller than the diameter of the expanded tubular pipe portion.

Each of the plurality of homogenizing classifying stages I, II, and III includes a homogenizing means having a cutting means (1*a*, 1*b*, 1*c*, 2, or 3), a shearing means or shearing propeller 15, 16, or 17 and a classifying filtering baffle wall (filtering means) 21, 22, or 23 wherein the shearing means or shearing propeller of a stage has a minimum clearance with the classifying filtering baffle wall of such stage. Each succeeding classifying filtering baffle wall filters the homogenized drilling fluid having smaller glob sizes of undissolved polymer granules than the homogenized drilling fluid of a preceding homogenizing classifying stage wherein a last stage classifying filtering baffle wall 23 filters therethrough a non-clogging homogenized drilling fluid to the fluid outlet 6.

In general each homogenizing classifying stage I, II, III maximizes the counter-reaction to the resiliently deforming and rapidly resealing capabilities of the globs of undissolved polymer granules to penetrate the globs and, thus, to unseal and dissolve at least part of the undissolved polymer granules. Moreover, each homogenizing stage I, II, III maximizes the counter-reaction to the deforming capability of slim-like strings within the drilling fluid.

More specifically, each homogenizing classifying stage I, II, III maximizes such counter-reaction via at least one disc-shaped cutter wheel 1*a*, 1*b*, 1*c*, 2, or 3, mounted on the shaft 45 and via the shearing means or shearing propeller 15, 16, or 17 mounted very closely and adjacent to the classifying filtering baffle wall 21, 22, or 23 (such as, $5000^{th}$ of an inch from such baffle wall 21, 22, or 23).

Since each of the shearing means or shearing propeller is identical, only one such shearing means or shearing propeller will be described in detail. In the preferred embodiment, the shearing means or shearing propeller 15 includes a plurality of radiating shearing edges 15*a* to shear the drilling fluid, the globs and slim-like strings flowing to an inlet side of the apertures 25 and bored filtering channels of the classifying filtering baffle wall 21. Thus, any buildup of such drilling fluid, the globs and slim-like strings are essentially eliminated.

This shearing means or shearing propeller 15 radiates to the outer limits of the classifying filtering baffle wall 21 without touching the interior surface of the homogenizing housing chamber or tubular pipe 40 so that the cutting edges 15*a* of the shearing means or shearing propeller 15 passes over significantly all apertures 25 of the classifying filtering baffle wall 21. The shearing means or shearing propeller 15 shears the filtered drilling fluid from the drilling fluid of a stage being mixed and homogenized. In the exemplary embodiment, there is approximately 20 lbs. of pressure in the homogenizing housing chamber or tubular pipe 40 to assist forcing the flow of the drilling fluid through the plurality of homogenizing classifying stages. Moreover, in the preferred embodiment, the tubular pipe 40 is filled to capacity.

The classifying filtering baffle wall 21 and the shearing propeller or shearing means 15 associated therewith has a minimum clearance with the filtering baffle wall to counteract to the resiliently deforming and rapidly resealing capabilities of the globs of undissolved polymer granules which are resisting filtering and, thus, to nullify the tendency of the drilling fluid to buildup, obstruct or clog the classifying filtering baffle wall 21.

In an effort to further reduce possible clogging in the homogenizer 10 when creating the non-clogging homogenized drilling fluid, the classifying filtering baffle wall 21 is relatively thin. Thus, the bored filtering channels in the classifying filtering baffle wall 21 are relatively short.

Figure 3:
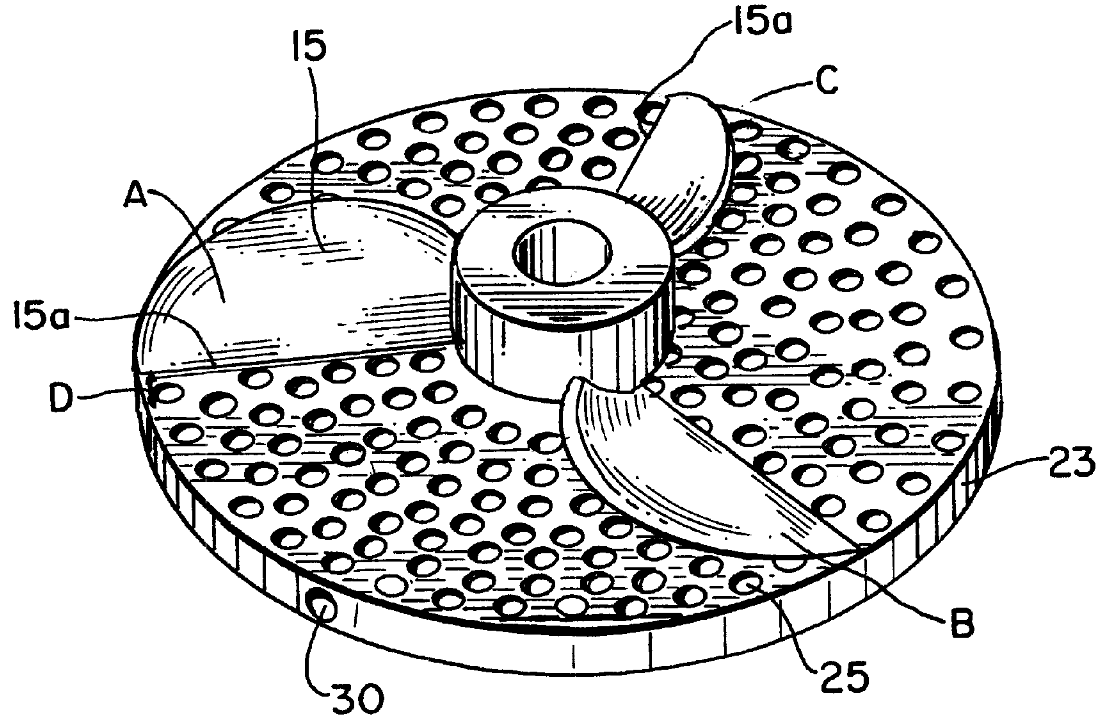
FIG. 3 illustrates a perspective view of the screen/baffle wall and shearing propeller.

Referring also to FIG. 3, each of the shearing propellers 15, 16, 17 includes a plurality of spaced cutting edges 15*a*, 16*a*, 17*a*, respectively. The shearing propellers 15, 16 and 17, preferably, have a slightly reduced diameter than the classifying filtering baffle wall 21, 22, 23 so that the cutting edges 15*a*, 16*a* and 17*a* radiate to all the apertures 25 but do not hit the interior surface of tubular pipe 40. The shearing propellers 15, 16, 17 cut the drilling fluid flowing through the apertures 25 to reduce the globs and slim-like strings and eliminate any buildup. For example, it is known that the globs in the drilling fluid from the "Poly Gator," described in the BACKGROUND, have accumulated when forced through a quarter inch (¼ inch) screen aperture of the closed-loop designed drilling fluid system's filter/screen FS. In those instances, drilling operations have been halted.

Figure 5A:
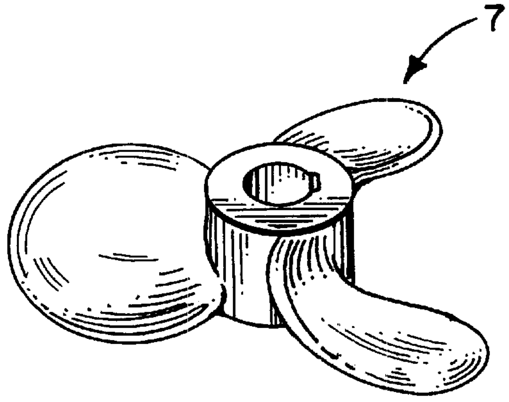
FIG. 5*a* illustrates a perspective view of the paddled propeller of the present invention.
Figure 5C:
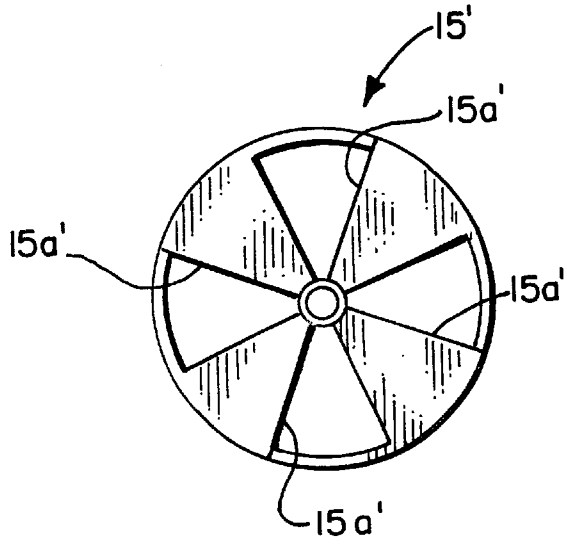
FIG. 5*b* illustrates a view of the shearing propeller with the removed surfaces, for the formation of the cutting edge, shown in phantom; and, FIG. 5*c* illustrates a view of an alternative embodiment of the shearing means of the present invention.
Figure 5B:
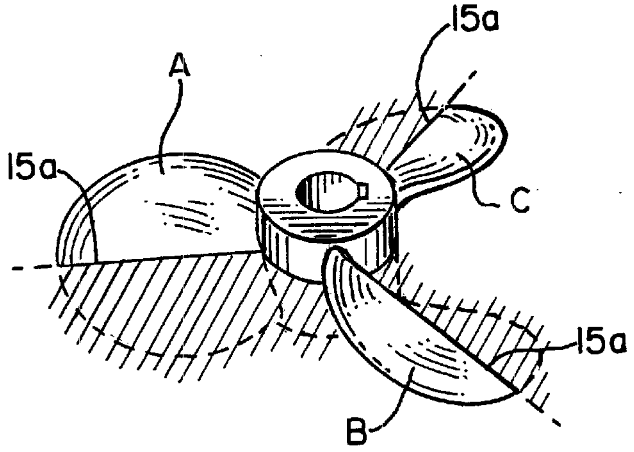

Referring now to FIG. 5*b*, the shearing propeller 15 is, in general, a propeller having a plurality of pitched paddles/blades A, B and C. Approximately half of the width of each paddle/blade A, B and C has been removed to create the shearing edges 15*a*, which are capable of being spaced by the distance D (FIG. 3) from the classifying filtering baffle wall 21. The distance D is approximately $5000^{th}$ of an inch from the inlet side surface of the classifying filtering baffle wall 21. Nevertheless, other distances can be used.

As can be appreciated, the shearing propeller profile is capable of placing shearing edges 15*a*, sufficiently close to the surface of the classifying filtering baffle wall 21. Therefore, as the homogenized drilling fluid flows through the apertures 25 and as the shearing propeller 15 revolves, the shearing edges 15*a* return to cut the homogenized drilling fluid to clear any buildup through the apertures 25. Moreover, these shearing edges 15*a* shear the globs so that the sheared part of the glob is released to the flow being filtered. If the sheared glob is still otherwise resisting filtering due to size, while not wishing to be bound by theory, it is believed that the advantageous results of the invention are obtained because the sheared glob is sheared again until that which remains is sufficiently small to be filtered.

Referring now to FIG. 5*c*, an alternate shearing means is shown. Shearing means 15' can be substituted for the shearing propellers 15, 16, 17. Shearing means 15' comprises a generally flat structure (non-pitched) having a plurality of spaced radiating cutting edges 15*a'*.

Figure 4A:
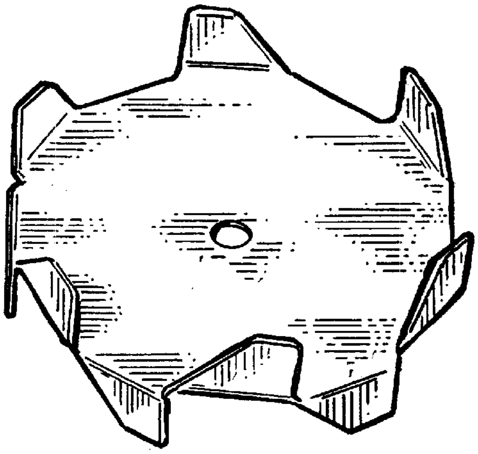
FIG. 4*a* illustrates a perspective view of the disc-shaped cutter wheel of the present invention.
Figure 4B:
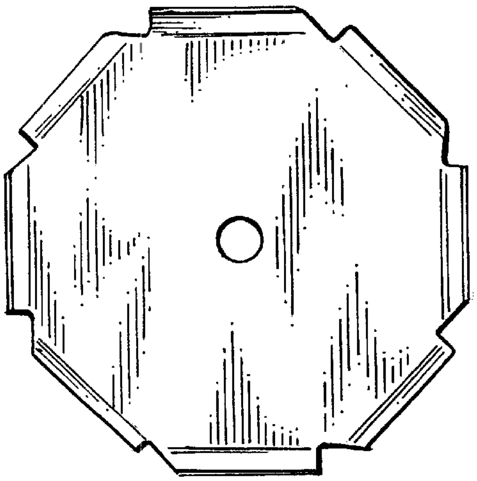
FIG. 4*b* illustrates a top view of an alternate embodiment of the discshaped cutter wheel of the present invention.
Figure 4C:
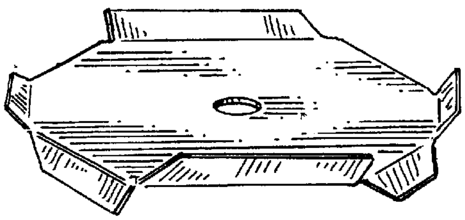
FIG. 4*c* illustrates a perspective view of the alternate embodiment of the disc-shaped cutter wheel of FIG. 4*b;*

In the preferred embodiment, there are three disc-shaped cutter wheels 1*a*, 1*b*, and 1*c* in stage I (the first stage), and one disc-shaped cutter wheel 2, 3 in each of the succeeding stages II and III, respectively. FIGS. 4*a* and 4*b* illustrate different configurations of the disc-shaped cutter wheels 1*a*, 1*b*, 1*c*, 2 and 3. Nevertheless, other cutting wheels may be substituted. Since the first stage I has three disc-shaped cutter wheels 1*a*, 1*b*, and 1*c*, while not wishing to be bound by theory, it is believed that the advantageous results of the invention are obtained because such disc-shaped cutter wheels create a sufficient amount of turbulence within the first stage I. Thus, a paddled propeller has been eliminated from the first compartment I. Nevertheless, a paddled propeller may be added as desired. FIG. 4c illustrates a perspective view of disc-shaped cutter wheel shown in FIG. 4b.

The disc-shaped cutter wheel of FIG. 4a, is a medium speed blade manufactured by McMaster Care Supply Company, and is described in Catalog No. 104, by McMaster Care Supply Company, pg. 331, copyright 1998. The disc-shaped cutter wheel of FIG. 4b, is a high-vane blade (Design C) manufactured by INDCO Inc., and is described in Catalog No. 186, by INDCO Inc., pg. 6, copyright 1999. Nevertheless, other disc-shaped cutter wheel designs may be substituted. In general, a paddle wheel configuration, in lieu of the disc-shaped cutter wheel design, is not preferred for the homogenization of the drilling fluid.

In the succeeding stages II and III, paddled propellers 7 and 8, respectively, are provided. Preferably, the paddled propellers 7 and 8 have a pitch which is reversed from that of the shearing propellers 15, 16, 17. These paddled propellers 7 and 8 are standard propellers used in mixers, as best seen in FIG. 5a. This reverse pitch is not shown in the FIGURES provided.

These paddled propellers 7 and 8 create turbulence and eliminate settling of the homogenized drilling fluid. More importantly, while not wishing to be bound by theory, it is believed that the advantageous results of the invention are obtained because the paddled propellers 7 and 8 create sufficient agitation within the drilling fluid so that the globs of undissolved polymer granules and, especially, those which were previously reduced, do not bind together or coalesce. As can be appreciated, any binding or coalescing of the globs of undissolved polymer granules during the open-loop process would be counter productive to the efforts of creating non-clogging homogenized drilling fluid. Further, the paddled propellers 7 and 8 assist in maximize the distribution of solids suspended in the drilling fluid in each stage II, III, respectively.

Referring again to FIGS. 2b and 3, the classifying filtering baffle walls 21, 22 and 23 each include at least two holes 30 (only one shown) formed in the outer edge so that the classifying filtering baffle walls 21, 22 and 23 are secured (bolted) to the homogenizing housing chamber or tubular pipe 40.

As shown in FIG. 2a, end plate 41 is adapted to be unbolted from the homogenizing housing chamber or tubular pipe 40. When the bolts 47 securing the classifying filtering baffle walls 21, 22, and 23 and bolts 48 on the legs pairs 42a and 42b of the homogenizing housing chamber or tubular pipe 40 are removed, the homogenizing housing chamber or tubular pipe 40 is capable of being moved rearwardly in the direction of ARROW 1, thus, exposing the shaft 45 and all that is mounted thereon. Thereby, the screen/baffle walls 21, 22 and 23, the shearing propellers 15, 16 and 17, paddled propellers 7 and 8, and the cutting wheels 1a, 1b, 1c, 2 and 3 are capable of being replaced and cleaned.

Referring also to FIG. 2a, the drilling fluid homogenizer 10 utilizes a 20 or 30 horsepower motor 60 which is significantly smaller and has significantly less weight than a 100-horsepower motor. Furthermore, the homogenizing housing chamber or tubular pipe 40 has an eight (8) or twelve (12) inch diameter and is approximately four (4) feet long. The homogenizer 10 using the eight (8) inch diameter pipe can output approximately 83 to 100 gallons/min. or, in other words, 5000 to 6000 gallons/hr. of a drilling fluid which has a glob size sufficiently less than the closed-loop designed drilling fluid system's filter/screen FS in one pass through the drilling fluid homogenizer 10. Thereby, the recycling tank of the known system, above, is eliminated since the drilling fluid homogenizer 10 of the present invention is capable of producing a high volume of highly dissolved and homogenized drilling fluid. Alternately, for a twelve (12) inch diameter pipe, an output of 283 to 350 gallons/min or, in other words, 17,000 to 21,000 gallons/hr. is expected.

The general dimensions of the drilling fluid homogenizer 10 (eight (8) or twelve (12) inch diameter pipe and a length of four (4) feet) are primarily advantageous for offshore drilling operations. In general, offshore drilling rigs provide numerous constraints regarding the dimensions of the drilling fluid homogenizer 10. On the other hand, onshore drilling rigs do not generally limit the dimensions of the homogenizing housing chamber or tubular pipe 40 of the drilling fluid homogenizer 10. Thus, the dimensions of the drilling fluid homogenizer 10 may be increased for onshore drilling operations. In general, the weight of homogenizer 10, the breaker size requirement (ampage) for the motor operating the homogenizer 10 and the space on-site, are not significant factors. Since, the breaker size requirement for the motor operating the drilling fluid homogenizer 10 is not a limiting factor, motors having increase horsepower may be used and the dimensions of the drilling fluid homogenizer 10 increased.

The drilling fluid homogenizer 10 for offshore operation has limited dimensions and a limited horsepower motor 60 so that if the offshore rig places the mud (drilling fluid) in the tanks on a level below the top deck, the need to disassemble the motor 60 is minimized, if not eliminated, from drilling rig to drilling rig. Moreover, the high throughput of the drilling fluid homogenizer 10, having the eight (8) or twelve (12) inch diameter pipe and a length of four (4) feet, is sufficient to supply non-clogging homogenized drilling fluid continuously "on demand."

As can be appreciated, the larger the dimensions of the drilling fluid homogenizer 10, the higher the throughput. Additionally, the dimensions of the drilling fluid homogenizer 10, may be significantly increased so that approximately 300 to 500 barrels/hr. may be produced during operations which pre-mix and process the drilling fluid mixture for an initial drilling fluid load transported to the offshore drilling rig. In summary, the dimensions of the drilling fluid homogenizer 10 may be increased or decreased to accommodate a maximum flow rate limit at the fluid outlet 6.

The drilling fluid homogenizer 10 further includes a flow rate control means 65 for controlling the rate in which the highly dissolved and homogenized drilling fluid exits the fluid outlet 6. The flow rate control means 65 controls the flow rate of the drilling fluid into the fluid inlet 5. For example, when replenishing the highly dissolved and homogenized drilling fluid, the high flow rate of 5000 to 6000 or 17,000 to 21,000 gallons/hr. is not necessarily needed. Thereby, the flow rate out of the fluid outlet 6 can be controlled accordingly. In the preferred embodiment, the flow rate control means 65 is an air diaphragm pump coupled in-line with the fluid inlet 5 whereby the volume of air into the air diaphragm pump is controlled to control the flow rate at the fluid outlet 6. Alternately, the flow rate control means 65 may comprise a controlled ball valve (not shown) coupled in-line with the fluid outlet 6. The flow rate control means 65 may include both the air diaphragm pump and the controlled ball valve.

More importantly, this high throughput of 17,000 to 21,000 gallons/hr. of the drilling fluid homogenizer 10 allows a non-clogging homogenized drilling fluid to be available "on demand" without increasing the surface area required for the placement of the drilling fluid homogenizer 10 to perform the dissolving and homogenizing, as would be required for the "Poly Gator." More importantly, the drilling fluid homogenizer 10 is significantly smaller and lighter in weight than the known systems since a smaller horsepower motor 60 is used. It should be noted that in general a 100 hp motor requires 150 amp breakers while a 30 hp motor requires 50 amp breakers. Other motors may be substituted, such as, an air motor.

As shown in FIG. 2*a*, the compact size of the drilling fluid homogenizer 10 allows it to be easily placed over the holding fluid tank T1 or alternately, the active fluid tank T2. A hose 60*a* from the holding fluid tank T1 to the fluid inlet 5 of the drilling fluid homogenizer 10 and a hose 60*b* from the fluid outlet 6 to the active fluid tank T2 places the drilling fluid homogenizer 10 in series therewith. In the preferred embodiment, there is no need for a return line from the fluid outlet 6 to the holding fluid tank T1, to another spare tank or to fluid inlet 5 for recycling the drilling fluid. Therefore, a return line is not shown.

In the preferred embodiment, the drilling fluid homogenizer 10 includes the homogenizing housing chamber or tubular pipe 40 having one end coupled to a motor 60 and the other end has the fluid outlet 6. On the top of the homogenizing housing chamber or tubular pipe 40, in close proximity to the one end, there is provided the fluid inlet 5. The homogenizing housing chamber or tubular pipe 40 has a diameter of eight (8) inches or twelve (12) inches and is divided into three homogenizing classifying stages I, II and III via three classifying filtering baffle walls 21, 22 and 23. Substantially the entire classifying filtering baffle wall 21, 22, 23 has formed therein apertures 25 (bored channels) wherein the apertures 25 of each succeeding classifying filtering baffle wall 22, 23 are smaller than the apertures 25 of the previous classifying filtering baffle wall. These apertures 25 (bored channels) define a predetermined glob size limit. As can be appreciated, the last stage predetermined glob size limit is a non-clogging glob size limit even though the globs have the ability to deform. The predetermined glob size limit defines the maximum glob size capable of being filtered through a classifying filtering baffle wall. Thus, the predetermined glob size limit of each succeeding classifying filtering baffle wall is reduced from the previous classifying filtering baffle wall.

In the exemplary embodiment, the center homogenizing classifying stage, homogenizing classifying stage II, has a predetermined glob size limit substantially equal to that of the closed-loop designed drilling fluid system's filter/screen FS. Thereby, the homogenized drilling fluid flowing through the last stage classifying filtering baffle wall 23 has glob sizes sufficiently less than the closed-loop designed drilling fluid system's filter/screen FS glob size limit.

In general, the classifying filtering baffle walls 21, 22 and 23 serves as screens, filters, sieves or classification means. In the exemplary embodiment, the apertures 25 (bored channels) of the last stage classifying filtering baffle wall 23 are approximately 5/32 of an inch in diameter or less. Typically, since the mud (drilling fluid) pumps of the pumping station PS have a filter/screen FS with pores of approximately ¼ of an inch, the drilling fluid flowing through the last stage classifying filtering baffle wall 23 is non-clogging. The apertures of the classifying filtering baffle wall 21 are approximately 5/16 of an inch and the apertures of the classifying filtering baffle wall 22 are approximately ¼ of an inch.

Initially, we designed a first drilling fluid homogenizer without the classifying filtering baffle walls 21, 22 and 23 and the associated shearing propellers 15, 16 and 17. This configuration mixed the additives and polymers. However, globs of undissolved granules of the polymer, such as the DRISPAC Polymer, used for fluid loss and which creates the filter cake in the wellbore hole, remained at a size which would still cause clogging within the closed-loop designed drilling fluid system 1.

The first drilling fluid homogenizer was modified to include the classifying filtering baffle walls 21, 22 and 23 and the associated shearing propellers 15, 16 and 17, and thus the drilling fluid homogenizer 10 of the present invention created. The drilling fluid homogenizer 10 reduced the globs of undissolved granules to a non-clogging size and homogenized the drilling fluid. The last stage classifying filtering baffle wall 23 had an aperture size of 5/32 of an inch or less.

Since, the globs of undissolved granules were reduced to a non-clogging size via the classifying filtering baffle walls 21, 22 and 23 and the associated shearing propellers 15, 16 and 17, in an alternate trial, the paddled propellers 7 and 8, and the cutting wheels 1*a*, 1*b*, 1*c*, 2 and 3 were eliminated from the drilling fluid homogenizer 10. After a trial run, the homogenizing housing chamber or tubular pipe 40 was opened for inspection. Upon inspection, especially, in the first stage I, an unacceptable amount of globs of undissolved granules of the polymer, such as the DRISPAC Polymer, and other non-homogenized polymers were collected. We predict that, over time, the globs of undissolved polymer granules and other homogenized polymers would collect could clog the homogenizer or at least cause it to operate with less efficiency.

During a trial run using the configuration of the drilling fluid homogenizer 10 described herein in detail, the drilling fluid was homogenized to an essentially non-clogging state of homogenization with only one pass through the drilling fluid homogenizer 10 with little or no residue of non-homogenized polymers or globs present. Moreover, the problematic "fish eyes" were not visible on the mesh M of the shale shaker SS.

It should be further noted that, as a protection mechanism to eliminate clogging globs from the drilling fluid, a screen and basket is used at the mud (drilling fluid) pumping station PS to catch the clogging globs. Overtime the clogging globs are cleaned from the screen and basket and oftentimes not recycled, thus forever lost. Also, the cleaning generally causes expensive downtime of drilling operations. During the trial run using the configuration of the drilling fluid homogenizer 10 of the present invention, essentially no clogging globs were present at the screen and basket of the mud pumping station PS. Moreover, such screen and basket where later removed. Even though such screen and basket were removed, and thus no protection mechanism existed to prevent clogging within the closed-loop designed drilling fluid system 1, drilling operations were not halted due to clogging globs. Moreover, the problematic "fish eyes" were not visible on the mesh M of the shale shaker SS and sheening of the shale shaker SS was not present.

THE METHOD

The method of homogenizing drilling fluid, having globs of undissolved polymer granules having clogging glob sizes and other additives is carried out in a open-loop process for providing non-clogging homogenized drilling fluid for use in a closed-loop designed drilling fluid system 1. The open-loop process of the method does not recycle the drilling fluid or homogenized drilling fluid to create the non-clogging homogenized drilling fluid. The ethod creates non-clogging homogenized drilling fluid by: (1) homogenizing the drilling fluid to create homogenized drilling fluid and to reduce said clogging glob sizes;(2) filtering a flow of said homogenized drilling fluid to create the non-clogging homogenized drilling fluid having globs of a non-clogging glob size when flowing in said closed-loop designed drilling fluid system 1; and, (3) during the step of (2), shearing the globs of said undissolved polymer granules having the clogging glob sizes suspended in the flow of the homogenized drilling into said globs of said non-clogging glob size.

In general, while not wishing to be bound by theory, it is believed that the advantageous results of the invention are obtained because the shearing step provides for not just reducing the clogging glob sizes, but all glob sizes to at least said non-clogging glob size. Moreover, the shearing step simultaneously dissolves at least part of the undissolved polymer granules of said globs suspended in said flow of said homogenized drilling fluid. Further, the sheared part of a glob is released to the flow of the homogenized drilling fluid.

The high throughput of the method is in part a result of the shearing step which simultaneously counter-reacts to the resiliently deforming and said rapidly resealing capabilities of some of the globs of undissolved polymer granules which are resisting filtering.

Further, homogenizing of the step (1) comprises: (1a) cutting the drilling fluid to penetrate at least some of the globs to unseal at least part of the undissolved polymer granules therein; and, (1b) simultaneous to the step (1a), dissolving at least some of said undissolved polymer granules unsealed.

Additionally, the homogenizing of the step (1) further comprises: creating turbulence in said drilling fluid. The turbulence minimizes coalescence of the globs and prevents settling of the globs of undissolved polymer granules and other additives in the drilling fluid.

In the preferred embodiment, the homogenizing of the step (1) comprises: cutting the drilling fluid with rotary disc cutting wheels 1*a*, 1*b*, 1*c*, 2, and 3; and, creating turbulence in said drilling fluid with rotary propellers 7 and 8 having a plurality of radiating paddles pitched in a direction of the flow of the homogenized drilling fluid.

The filtering of the step (2) comprises: receiving the homogenized drilling fluid at an inlet side surface of an apertured structure wherein apertures of the apertured structure are dimensioned to correspond to the non-clogging glob size; passing the non-clogged homogenized drilling fluid through the apertures of the apertured structure; and, exiting the non-clogged homogenized drilling fluid through an outlet side surface of the apertured structure. As can be appreciated, any globs at said inlet side surface or in relatively close proximity thereto not having the non-clogging glob size will essentially resist filtering through the apertures. Thus, in an effort to eliminate build-up or to eliminate residue within the homogenizer 10, shearing of the step (3) comprises: rotating a plurality of spaced radiating shearing blades at a minimum clearance over the inlet side surface of the apertured structure to further reduce the globs to the non-clogging glob size.

In the preferred embodiment, the shearing step further comprises: directing at least part of the drilling fluid and, thus, the globs of said undissolved polymer granules in a direction opposite a direction of the flow of the homogenized drilling fluid via a pitch of the plurality of spaced radiating shearing blades A, B, and C.

The homogenizing step of (1) includes: (1c) filtering a flow of said homogenized drilling fluid to create a filtered homogenized drilling fluid having glob sizes to a predetermined glob size limit; (1d) during the step of (1c), shearing the globs of said undissolved polymer granules having the clogging glob sizes suspended in said flow of said homogenized drilling fluid into said globs of said predetermined glob size limit; and, (1e) homogenizing said filtered homogenized drilling fluid having said globs of said predetermined glob size limit to reduce said glob sizes.

The homogenizing of the step (1e) comprises: (1ea) cutting said filtered homogenized drilling fluid having said globs to said predetermined limit size; and, (1eb) creating turbulence in said filtered homogenized drilling fluid.

The homogenizing step of (1) further comprises: (1f) filtering a flow of said homogenized drilling fluid to create a filtered homogenized drilling fluid having globs of a second predetermined glob size limit wherein said second predetermined glob size limit is larger than said predetermined glob size limit of step (1c) (1g) during the step of (1f), shearing said globs of said undissolved polymer granules having the clogging glob sizes suspended in said flow of said homogenized drilling fluid into said globs of said second predetermined glob size limit; and, (1h) homogenizing said filtered homogenized drilling fluid having said globs of said second predetermined glob size limit to reduce said glob sizes. The homogenizing of the step (1h) comprises: (1ha) cutting said filtered homogenized drilling fluid having said globs of said second predetermined glob size limit; and, (1hb) creating turbulence in said filtered homogenized drilling fluid having said globs of said second predetermined glob size limit.

The method of the present invention is designed to create a non-clogging homogenized drilling fluid which will not clog the closed-loop designed drilling fluid system's filter/screen FS. In addition to the filter/screen FS, in the past, a protection mechanism (screen and basket) was incorporated in-line between the output of the Closed-Loop Preprocessors and the inlet of the pumping station PS. During drilling operations, the screen/basket was periodically cleaned of globs in an effort to reduce clogging of the filter/screen FS. Nevertheless, clogging of the filter/screen FS still occurred. The pores or apertures of the filter/screen FS of the closed-loop designed drilling fluid system 1 will vary. Thus, the apertures of the filtering means should be modified to a size less than the aperture size of the filter/screen FS for a particular closed-loop designed drilling fluid system 1. In general, only the last stage classifying filtering means or classifying filtering means 23 needs to be changed to create the non-clogging homogenized drilling fluid for a particular filter/screen FS, if needed, so that the non-clogging homogenized drilling fluid is adapted to flow through the apertures or other dimensioned apertures of the particular filter/screen FS.

In the exemplary embodiment, wherein the non-clogging homogenized drilling fluid is non-clogging through the closed-loop designed drilling fluid system 1, the non-clogging glob size is less than a quarter inch. In the preferred embodiment, the non-clogging glob size limit is less than or equal to 5/32 of an inch which is believed to be not just non-clogging but a fail-safe non-clogging size limit since the globs are capable of resilient deforming.

In the preferred embodiment, the non-clogging glob size limit is designed to pass glob sizes sufficiently less than the pores or apertures of the filter/screen FS so that even if a glob was filtered via its deforming capability, the glob size would essentially always be non-clogging the pores or apertures of the filter/screen FS.

The method of homogenizing of the present invention is capable of filtering the non-clogging homogenized drilling fluid at a rate of approximately 5000 to 6000 gallons/hr. for an 8 inch diameter tubular pipe portion. After the active fluid tank T2 is essentially full, the rate should be controlled to reduce the rate of 5000 to 6000 gallons/hr., as necessary. Nevertheless, the controlled rate should always provide the non-clogging homogenized drilling fluid "on demand" to accommodate drilling operations.

Alternately, the method of homogenizing of the present invention is capable of filtering the non-clogging homogenized drilling fluid at a rate of approximately 17,000 to 21,000 gallons/hr. for a 12 inch diameter tubular pipe portion. After the active fluid tank T2 is essentially full, this rate should be controlled to provide the non-clogging homogenized drilling fluid on demand to accommodate drilling operations.

Nevertheless, depending on the drilling unit, drilling operations, and/or the depth of the wellbore hole at any given time the rate may vary. Thus, the rate should be at a level which will provide "on demand" availability of the non-clogging homogenized drilling fluid during drilling operations.

Since space is very limited on an off-shore drilling rig platform, the homogenizer 10 can be used for all drilling fluids in the closed-loop designed drilling fluid system. Typically, during an upper part of a wellbore hole being drilled (that which is drilled before a lower part) a water-based drilling fluid is used. This water-based drilling fluid can further be modified for the subterranean geology.

Thus, the method of drilling a wellbore hole of the present invention uses a closed-loop designed drilling fluid system wherein said closed-loop designed drilling fluid system includes at least one holding fluid tank, at least one active fluid tank, a drilling fluid pumping station, and at least one reclamation fluid tank; and a drilling unit coupled in series with said closed-loop designed drilling fluid system. The method includes the steps of: (1) creating a drilling fluid source in a holding fluid tank having clogging properties wherein said drilling fluid source includes clogging glob sizes of globs of undissolved polymer granules and other additives; and, (2) providing a supply of said drilling fluid source from said holding fluid tank at a flow rate to a drilling fluid homogenizer. Further, in said drilling fluid homogenizer, the method of drilling includes: (3) homogenizing said drilling fluid source to create homogenized drilling fluid and to reduce said clogging glob sizes; (4) filtering a flow of said homogenized drilling fluid to create said non-clogging homogenized drilling fluid having globs of a non-clogging glob size when flowing through said closed-loop designed drilling fluid system; and, (5) during the step of (4), shearing said globs of said undissolved polymer granules having said clogging glob sizes suspended in said flow of said homogenized drilling fluid into said globs of said non-clogging glob size; (6) filling an active fluid tank with said non-clogged homogenized drilling fluid.

The method of drilling further includes in said closed-loop designed drilling fluid system the steps of: (7) providing said non-clogged homogenized drilling fluid to said drilling unit; and, (8) drilling said wellbore hole with said drilling unit using said non-clogged homogenized drilling fluid.

Further the method of drilling includes the step of: (9) replenishing said non-clogged homogenized drilling fluid in said active fluid tank. However when replenishing the active fluid tank, such replenishing of the active fluid tank may require replenishing said drilling fluid source in said holding tank and repeating steps (1)–(6) as needed.

The method of drilling further comprising the step of: repeating steps (1)–(8) wherein said drilling fluid source includes a water-based drilling fluid of a second formula. The second formula may require a higher salt content depending on the subterranean geology of the earth. Nevertheless, the water-based drilling fluid may be modified to include other additives or polymers to accommodate the drilling operations and the environment.

The method of drilling further comprises in said closed-loop designed drilling fluid system the steps of recovering said non-clogging homogenized drilling fluid from said wellbore hole to said at least one reclamation tank; providing the recovered non-clogging homogenized drilling fluid to said drilling unit; and, drilling said wellbore hole with said drilling unit using said recovered non-clogged homogenized drilling fluid.

The lower part of a wellbore hole to be drilled may require a different type of drilling fluid such as a synthetic drilling fluid. Thus, the method includes creating a second drilling fluid source in a second holding tank having non-homogenizing properties; and, providing a continuous supply of said second drilling fluid source from said second holding tank to said drilling fluid homogenizer. The method further includes in said drilling fluid homogenizer: homogenizing said second drilling fluid source to create a second source of homogenized drilling fluid; filtering a flow of said second source of said homogenized drilling fluid to create filtered homogenized drilling fluid; and, filling a second active fluid tank with said filtered homogenized drilling fluid.

The method further includes in said closed-loop designed drilling fluid system: providing said filtered homogenized drilling fluid to said drilling unit; and, drilling said wellbore hole with said drilling unit using said filtered homogenized drilling fluid.

A factor in homogenizing drilling fluid and, especially, in providing a high throughput of non-clogging homogenized drilling fluid, is the counter-reaction of those globs of undissolved polymers having resiliently deforming and rapidly resealing capabilities. Thus, a method of maximizing the counter-reaction to resiliently deforming and rapidly resealing capabilities of globs of undissolved polymer granules in a drilling fluid to dissolve said undissolved polymer granules includes the steps of: (1) cutting said drilling fluid to counter-react to said resiliently deforming and rapidly resealing capabilities of said globs of said undissolved polymer granules suspended in said drilling fluid; (2) during the cutting of step (1), penetrating at least one glob of said globs to dissolve at least some of said undissolved polymer granules of said at least one glob; (3) filtering a flow of said drilling fluid to create filtered drilling fluid having globs of a predetermined glob size limit; and, (4) shearing said globs of said undissolved polymer granules suspended in said flow of said drilling fluid into said globs of said predetermined glob size limit.

The shearing of the step (4) counter-reacts to said resiliently deforming and rapidly resealing capabilities of said globs of said undissolved polymer granules suspended in said drilling fluid to penetrate said globs of said undissolved polymer granules to dissolve at least some of said undissolved polymer granules. Moreover, the shearing of step (4) releases at least part of a sheared glob to said flow of said drilling fluid.

The method of maximizing counter-reaction further comprises the step of: (5) creating turbulence in said drilling fluid to minimize coalescing of said globs of said undissolved polymer granules.

In the preferred embodiment, the cutting of the step (1) is performed with a rotary disc-shaped cutter wheel; and, the creating turbulence of the step (5) is performed with a rotary propeller having a plurality of radiating paddles pitched in a direction of said flow of said drilling fluid. Nevertheless, in lieu of the rotary propeller at least one additional rotary disc-shaped cutter wheel may be substituted.

In general, the filtering of the step (3) comprises: receiving said drilling fluid at an inlet side surface of an apertured structure wherein apertures of said apertured structure are dimensioned to correspond to said predetermined glob size limit; passing said drilling fluid having said predetermined glob size limit through said apertures of said apertured structure; and, exiting said drilling fluid having said predetermined glob size limit through an outlet side surface of said apertured structure.

Preferably, the predetermined glob size limit is a non-clogging glob size when flowing in the closed-loop designed drilling fluid system 1.

In general the shearing of step (4) is performed via rotating a plurality of spaced radiating shearing blades at a minimum clearance over said inlet side surface of said apertured structure. Moreover, the shearing of step (4) comprises: directing at least part of said drilling fluid and said globs of said undissolved polymer granules in a direction opposite a direction of said flow of said drilling fluid via a pitch of said plurality of spaced radiating shearing blades.

It should be noted, that the method of maximizing counter-reaction is generally performed under pressure. Keep in mind, that the homogenizing, cutting, reducing, and shearing are carried out, preferably, in an 8" or 12" diameter expanded tubular pipe portion and which is approximately 4 ft. long. Furthermore, rotatable shaft 45 is rotated at a speed of approximately 1750 RPMs via a 30–40 horsepower motor 60.

Furthermore, the method of maximizing counter-reaction further comprises the step of: after the step of (2), repeating said steps of (1)–(4) until said predetermined glob size limit is a non-clogging glob size limit when flowing through the closed-loop designed drilling fluid system 1.

It is noted that the embodiments described herein in detail, for exemplary purposes, is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A method of homogenizing drilling fluid, having globs of undissolved polymer granules having clogging glob sizes and other additives, in an open-loop process for providing non-clogging homogenized drilling fluid for use in a closed-loop designed drilling fluid system, said method including the steps of:

(1) homogenizing said drilling fluid to create homogenized drilling fluid and to reduce said clogging glob sizes;

(2) filtering a flow of said homogenized drilling fluid to create said non-clogging homogenized drilling fluid having globs of a non-clogging glob size when flowing through said closed-loop designed drilling fluid system; and, (3) during the step of (2), shearing said globs of said undissolved polymer granules having said clogging glob sizes suspended in said flow of said homogenized drilling fluid into said globs of said non-clogging glob size.

2. The method of claim 1, wherein the step of (3) simultaneous dissolves at least part of said undissolved polymer granules of sheared globs suspended in said flow of said homogenized drilling fluid.

3. The method of claim 1, wherein said drilling fluid is a water-based drilling fluid and wherein some globs of said globs of undissolved polymer granules have capabilities of resiliently deforming and rapidly resealing when sheared.

4. The method of claim 3, wherein the step of (3) simultaneously releases part of a sheared glob to said flow of said homogenized drilling fluid.

5. The method of claim 3, wherein the step of (3) simultaneously counter-reacts to said capabilities of said resiliently deforming and said rapidly resealing of said some globs of said undissolved polymer granules which are resisting said filtering of the step(2).

6. The method of claim 3, wherein said homogenizing of the step (1) comprises:

(1a) cutting said drilling fluid to penetrate at least some of said globs to unseal at least part of said undissolved polymer granules therein; and, (1b) simultaneous to the step (1a), dissolving at least some of said undissolved polymer granules unsealed.

7. The method of claim 6, wherein said homogenizing of the step (1) further comprises:

(1c) creating turbulence in said drilling fluid to minimize coalescence of said globs and to prevent settling of said globs of said undissolved polymer granules and said other additives.

8. The method of claim 1, wherein said homogenizing of the step (1) comprises:

(1a) cutting said drilling fluid; and, (1b) creating turbulence in said drilling fluid.

9. The method of claim 1, wherein said homogenizing of the step (1) comprises:

(1a) cutting said drilling fluid with a rotary disc cutting wheel; and, (1b) creating turbulence in said drilling fluid to minimize coalescing of said globs of said undissolved polymer granules with a rotary propeller having a plurality of radiating paddles pitched in a direction of said flow of said homogenized drilling fluid.

10. The method of claim 9, wherein said filtering of the step (2) comprises:

(2a) receiving said homogenized drilling fluid at an inlet side surface of an apertured structure wherein apertures of said apertured structure are dimensioned to correspond to said non-clogging glob size;

(2b) passing said non-clogged homogenized drilling fluid through said apertures of said apertured structure; and, (2c) exiting said non-clogged homogenized drilling fluid through an outlet side surface of said apertured structure; and wherein said shearing of the step (3) comprises:

(3a) rotating a plurality of spaced radiating shearing blades at a minimum clearance over said inlet side surface of said apertured structure.

11. The method of claim 10, wherein said shearing of the step (3) further comprises:

(3b) directing at least part of said drilling fluid and said globs of said undissolved polymer granules in a direction opposite a direction of said flow of said homogenized drilling fluid via a pitch of said plurality of spaced radiating shearing blades.

12. The method of claim 1, wherein the homogenizing step of (1) comprises:

(1a) filtering a flow of said homogenized drilling fluid to create a filtered homogenized drilling fluid having globs of a predetermined glob size limit;

(1b) during the step of (1a), shearing said globs of said undissolved polymer granules having said clogging glob sizes suspended in said flow of said homogenized drilling fluid into said globs of said predetermined glob size limit; and, (1c) homogenizing said filtered homogenized drilling fluid having said globs of said predetermined glob size limit to reduce said glob sizes.

13. The method of claim 12, wherein the shearing of the step (1b) dissolves at least part of said undissolved polymer granules of sheared globs of said undissolved polymer granules suspended in said flow of said homogenized drilling fluid.

14. The method of claim 12, wherein the step of (1b) simultaneously releases part of a sheared glob to said flow of said homogenized drilling fluid.

15. The method of claim 12, wherein said drilling fluid is a water-based drilling fluid and wherein some globs of said globs of undissolved polymer granules have capabilities of resiliently deforming and rapidly resealing when sheared.

16. The method of claim 15, wherein the step of (1b) simultaneously counter-reacts to said capabilities of said resiliently deforming and said rapidly resealing of said some globs of said undissolved polymer granules which are resisting said filtering of the step (1a).

17. The method of claim 12, wherein said homogenizing of the step (1c) comprises:

(1ca) cutting said filtered homogenized drilling fluid having said globs of said predetermined limit size; and, (1cb) creating turbulence in said filtered homogenized drilling fluid.

18. The method of claim 12, wherein the homogenizing step of (1) further comprises:

(1d) filtering a flow of said homogenized drilling fluid not filtered by step (1a) to create a filtered homogenized drilling fluid having globs of a second predetermined glob size limit wherein said second predetermined glob size limit is larger than said predetermined glob size limit of step (1a);

(1e) during the step of (1d), shearing said globs of said undissolved polymer granules having said clogging glob sizes suspended in said flow of said homogenized drilling fluid into said globs of said second predetermined glob size limit; and, (1f) homogenizing said filtered homogenized drilling fluid having said globs of said second predetermined glob size limit to reduce said glob sizes.

19. The method of claim 18, wherein said homogenizing of the step (1c) comprises:

(1ca) cutting said filtered homogenized drilling fluid having said globs of said predetermined glob size limit; and, (1cb) creating turbulence in said filtered homogenized drilling fluid having said globs of said predetermined glob size limit; and wherein said homogenizing of the step (1f) comprises:

(1fa) cutting said filtered homogenized drilling fluid having said globs of said second predetermined limit size; and, (1fb) creating turbulence in said filtered homogenized drilling fluid having said globs of said second predetermined limit size.

20. The method of claim 1, wherein said non-clogging homogenized drilling fluid is adapted to flow through quarter inch apertures of a filter/screen device of said pumping station of said closed-loop designed drilling fluid system.

21. The method of claim 20, wherein said non-clogging glob size is less than a quarter inch and wherein said non-clogging homogenized drilling fluid is non-clogging through said closed-loop designed drilling fluid system.

22. The method of claim 21, wherein said non-clogging glob size is less than or equal to 5/32 of an inch.

23. The method of claim 1, wherein said filtering step (2) further comprises:

(2a) creating said non-clogging homogenized drilling fluid at a rate of 5000 to 6000 gallons/hr.; and, (2b) controlling said rate to reduce said rate of said 5000 to 6000 gallons/hr., as necessary.

24. The method of claim 1, wherein said filtering step (2) further comprises:

(2a) creating said non-clogging homogenized drilling fluid at a rate of 17,000 to 21,000 gallons/hr.; and, (2b) controlling said rate to reduce said rate of said 17,000 to 21,000 gallons/hr., as necessary.

25. The method of claim 1, wherein said filtering step (2) further comprises:

(2a) creating said non-clogging homogenized drilling fluid at a rate to provide on demand availability of said non-clogging homogenized drilling fluid during drilling operations; and, (2b) controlling said rate to maintain said on demand availability of said non-clogging homogenized drilling fluid during said drilling operations.

26. The method of claim 1, wherein said closed-loop designed drilling fluid system is onshore.

27. The method of claim 1, wherein said closed-loop designed drilling fluid system is offshore.

28. A method of maximizing counter-reaction to resiliently deforming and rapidly resealing capabilities of globs of undissolved polymer granules in a drilling fluid to dissolve said undissolved polymer granules, said method including the steps of:

(1) cutting said drilling fluid to counter-react to said resiliently deforming and rapidly resealing capabilities of said globs of said undissolved polymer granules suspended in said drilling fluid;

(2) during the cutting of step (1), penetrating at least one glob of said globs to dissolve at least some of said undissolved polymer granules of said at least one glob;

(3) filtering a flow of said drilling fluid to create filtered drilling fluid having globs of a predetermined glob size limit; and, (4) shearing said globs of said undissolved polymer granules suspended in said flow of said drilling fluid into said globs of said predetermined glob size limit.

29. The method of claim 28, wherein the shearing of the step (4) counter-reacts to said resiliently deforming and rapidly resealing capabilities of said globs of said undissolved polymer granules suspended in said drilling fluid to penetrate said globs of said undissolved polymer granules to dissolve at least some of said undissolved polymer granules.

30. The method of claim 28, wherein the shearing of step (4) releases at least part of a sheared glob to said flow of said drilling fluid.

31. The method of claim 28, further comprising the step of:

(5) creating turbulence in said drilling fluid to minimize coalescing of said globs of undissolved polymer granules.

32. The method of claim 31, wherein said cutting of the step (1) comprises:

(1a) cutting said drilling fluid with a rotary disc cutting wheel; and, wherein said creating turbulence of the step (5) comprises:

(5a) creating turbulence in said drilling fluid with a rotary propeller having a plurality of radiating paddles pitched in a direction of said flow of said drilling fluid.

33. The method of claim 28, wherein said filtering of the step (3) comprises;

(3a) receiving said drilling fluid at an inlet side surface of an apertured structure wherein apertures of said apertured structure are dimensioned to correspond to said predetermined glob size limit;

(3b) passing said drilling fluid having said globs of said predetermined glob size limit through said apertures of said apertured structure; and, (3c) exiting said drilling fluid having said globs of said predetermined glob size limit through an outlet side surface of said apertured structure; and wherein said shearing of step (4) comprises:

(4a) rotating a plurality of spaced radiating shearing blades at a minimum clearance over said inlet side surface of said apertured structure.

34. The method of claim 33, wherein said predetermined glob size limit is a non-clogging glob size when flowing in a closed-loop designed drilling fluid system.

35. The method of claim 33, wherein said shearing of step (4) further comprises:

(4b) directing at least part of said drilling fluid and said globs of said undissolved polymer granules in a direction opposite a direction of said flow of said drilling fluid via a pitch of said plurality of spaced radiating shearing blades.

36. The method of claim 28, further comprising the step of:

(5) creating pressure; and, (6) under said pressure performing the steps of (1)–(4).

37. The method of claim 36, further comprising the step of:

(7) after the step of (2), repeating said steps of (1)–(4) until said predetermined glob size limit is a non-clogging glob size limit when flowing through a closed-loop designed drilling fluid system.

* * * * *